Patented June 17, 1941

2,245,579

UNITED STATES PATENT OFFICE 2,245,579

PROCESS OF PREPARING ACTIVATED CARBON

Raymond G. Davis, Bellevue, Del.

No Drawing. Application August 11, 1938,
Serial No. 224,262

1 Claim. (Cl. 252—286)

This invention relates to the production of activated carbon and more particularly to the production of highly active carbon from a wet or water-containing active carbon which cannot be dried by ordinary methods without losing its activity to an objectionable degree.

In the usual method of producing activated carbon, the hot activated mass is discharged from the activating furnace, allowed to cool, ground, washed with a dilute aqueous solution of a neutralizing agent such as an acid or alkali or with water or with both to free it from inorganic material, filtered and then dried by heating to elevated temperatures to produce a product which contains substantially no moisture and which is ready for shipment and use.

However, certain processes for the production of activated carbon and particularly those processes wherein carbonizable organic material is activated at relatively low temperatures with chemical agents, yield, upon washing of the carbon product in the customary manner to remove the activating chemical therefrom, followed by drying in the customary manner as by heating to an elevated temperature, or by passing relatively dry air either at room or at elevated temperatures thereover, an activated carbon product the carbon of which has little or no decolorizing activity. Although the activity of the carbon contained in the wet mass before drying such a carbon product will be excellent, the carbon upon drying by the customary methods, loses activity, the loss in activity increasing with the percent of moisture removed. It is obviously undesirable to supply to the trade a decolorizing carbon containing as much as the 80% of moisture which carbons of this type retain when filtered "dry" on the filter press, since although the carbon content of such a product has a high actual decolorizing efficiency, the product itself has a low carbon content, and therefore has a low apparent activity. In this connection "apparent activity" of a product means the activity of the carbon content of the product multiplied by the percentage of carbon present in the product which obviously varies inversely with the percentage of water present. Other factors which militate against supplying such a wet product are the cost of handling and shipping the water content thereof, and the undesirability of using carbons of high water content in certain decolorizing processes because of the objectionable dilution or incompatibility of the solution being decolorized with water.

The principal object of this invention is to devise a method for the removal of water from such water-containing decolorizing carbons without objectionable loss in activity of the carbon content of the product.

Another object of the invention is to devise a process for the dehydration of such decolorizing carbons which simultaneously increases the apparent activity of the product.

Other objects will more fully hereinafter appear.

I have discovered that water may be removed from activated carbons of the type described above without lowering the activity of the carbon content thereof to an objectionable extent and therefore correspondingly increasing the apparent activity of the product, by contacting the water-containing carbon mass with a water-miscible volatile organic solvent for a period of time sufficient to dissolve and displace a considerable portion of the water therefrom, and thereafter separating the carbon from the solvent containing dissolved water. A large part of the water originally contained in the carbon is thus displaced and dissolved by the volatile organic solvent. The separated carbon will contain substantial amounts of the organic solvent employed which because of its volatility may readily be removed from the carbon by allowing it to stand in an open space, by passing air thereover, or by subjecting it to the action of a vacuum. It is preferred not to heat the carbon to remove the solvent therefrom since elevation of the temperature of the carbon for this purpose injures the activity of the carbon. However, it is possible to supply only sufficient heat to prevent the lowering of the temperature of the carbon due to evaporation of the solvent and any water which evaporates, without objectionable lowering of the activity of the carbon. In general this latter expedient will be dispensed with since it involves an additional step and necessitates careful control of the application of heat.

Any water-miscible volatile organic solvent may be employed in the process, but it is preferred from the standpoint of economy to utilize those which are more readily available, such as methyl alcohol, ethyl alcohol, acetone and the like. However, less common water-miscible readily volatile solvents such as normal propyl alcohol, isopropyl alcohol, tertiary butyl alcohol, etc. may be used. Obviously it is preferred to use a solvent which does not contain considerable amounts of water since the presence of water reduces its effectiveness for the desired purpose. While for maximum removal of water it is preferred to use anhydrous or substantially anhydrous solvents, solvents containing appreciable quantities of water may be used. Thus, ordinary commercial denatured ethyl alcohol which contains up to 5% of water may be used in the process of the invention with very satisfactory results.

In this description, the term "water-miscible" is employed to designate an organic solvent which at ordinary room temperatures is completely miscible with water in all proportions, that is, one whose solubility in water is commonly designated as infinite.

The term "volatile" as applied to the organic solvent which is preferably employed, is intended to mean a solvent whose volatility under the conditions of the treatment is sufficiently high that the separated mass of treated carbon will lose practically all of the solvent contained therein within a reasonable period of time. At the same time it is desirable that the volatility at ordinary handling temperatures be not excessive in order to avoid difficulties in handling and treatment. The solvents designated above as suitable have a boiling point lying between 50 and 100° C. and this is one indication of satisfactory volatility. Within this range the lower the boiling point the higher, in general, the volatility and the more rapid the evaporation of the solvent. Thus, acetone which boils at 56.5° C. and methyl alcohol which boils at 66° C. evaporate very rapidly under the conditions of operation.

The treatment may be repeated one or more times, the separated product, either with or without evaporation of the solvent therefrom as described above, being contacted with another portion of the solvent. With a given quantity of solvent a much better separation of water is possible if the solvent be divided up into a plurality of lots, with which the carbon is successively treated, then where the whole quantity of solvent is employed at once.

Under certain circumstances, instead of using a volatile solvent as described above, it may be desirable to use a water-miscible solvent which is not readily volatile, such as ethylene glycol, glycerine, or the like, depending upon solution and displacement of the water thereby and separation of the carbon from the excess. This procedure is generally not preferred because the resulting product contains fairly large amounts of the solvent and consequently does not have a desirably high apparent activity. However, for some purposes where the product is to be used in decolorizing liquids of the type of the solvent employed, this procedure is suitable. Thus where the carbon is to be used for decolorizing glycerine and it is undesirable to employ a carbon containing large amounts of water, the wet or water-containing carbon may be contacted with glycerine, one or more times, with separation of the carbon from the glycerine solution after each contact, the carbon thus obtained being employed to decolorize impure glycerine.

The amount of organic water-miscible solvent employed relative to the wet or water-containing activated carbon may be varied within extremely wide limits, depending upon the water content of the carbon and the extent to which it is desired to reduce the same by the treatment. In general, however, at least sufficient will be employed to give a filterable or centrifugable slurry which can be treated to remove the solution of water and solvent from the carbon. Amounts much larger than such an amount may be used if desired, and it will be understood that the greater the amounts, the greater will be the degree of removal of water from the carbon.

Instead of commingling the water-containing carbon with the organic solvent, the objects of the invention may be attained by washing the carbon on a filter with one or more lots of solvent or with a continuous inflow of solvent. However, for reasons of simplicity and effectiveness of operation, it will ordinarily be preferred to simply commingle the carbon with the solvent for a period of time sufficient to insure intimate contact and maximum solution and displacement of water by the solvent.

The separation of the carbon from the solution of water-miscible organic solvent and dissolved water may be accomplished in any desired manner as by filtering, centrifuging, or by mechanical separation in any other method. It will usually be desirable to treat the thus separated carbon in a suitable manner and for a sufficient period of time to remove therefrom substantially all of the volatile organic solvent contained therein and this is readily effected by subjecting the carbon to the action of a vacuum, by allowing the carbon to stand in the air, or by passing air or other gas, preferably at a temperature not above ordinary room temperature, over the mass. Preparatory to being so treated, the mass of carbon may be subdivided for greater exposure and consequently for more rapid evaporation of the solvent therefrom.

Examples of methods of carrying the invention into practice are given below. In each case there is also given the method of preparing the wet carbon to which the invention is applied.

Example I 10 mesh pine sawdust was admixed with 40% sulphuric acid in such proportions that the ratio of $H_2SO_4$ to dry sawdust was 4 to 1. The mixture was heated to 180° C. and maintained at that temperature for 1 hour. The material was removed from the calcining furnace, quenched in a large volume of water, ground and washed to remove substantially all of the residual acid therefrom. The filtered product had a moisture content of 74%, and its carbon content had a relative decolorizing efficiency of 158. The product had an apparent relative efficiency of 41.

This product was washed with approximately three times its weight of acetone, by washing in the filter press. The product was spread out in a relatively large area and was allowed to stand at room temperature and in the open air for one hour to remove the residual acetone. The product now contained 67% of carbon and 33% of water, and its carbon content had a relative efficiency of 143. The apparent relative efficiency of the product was 95.8.

Example II 10 mesh pine sawdust was admixed with 40% phosphoric acid in such amounts that the ratio of $H_3PO_4$ to dry sawdust was 2 to 1. The mixture was heated to 300° C. in three hours and 47 minutes and immediately upon reaching this temperature was removed from the furnace and quenched in a relatively large volume of water. The wet material was ground and thoroughly washed with water. Upon filtration, a product was obtained which contained 77.2% of water, the carbon content of which had a relative efficiency of 330, and the apparent relative efficiency of which was 75.24.

This product was admixed with approximately twice its volume of anhydrous methyl alcohol, and the mixture was agitated thoroughly for approximately 10 minutes. The mixture was then filtered and the filtered carbon was spread out and allowed to stand in the open air for 1 hour. The product now contained 66.4% of carbon and 33.6% of moisture and the relative efficiency of its carbon content was 303. The apparent relative efficiency of the product was 201.2.

*Example III*

10 mesh pine sawdust was commingled with 40% aqueous phosphoric acid in such amounts that the ratio of $H_3PO_4$ to dry sawdust was 3 to 1. The mixture was heated to 300° C. in 4 hours and 5 minutes and immediately upon reaching that temperature was removed and quenched in a relatively large volume of water. The product was ground, washed and filtered as before. The wet product thus obtained had a moisture content of 82.5% and the relative efficiency of its carbon content was 340. The apparent relative efficiency of this product was 59.5. This product was commingled with twice its volume of methyl alcohol (anhydrous) and agitated and filtered as in Example II. The filtered carbon was then placed in a container and dry air at room temperature was blown through the mass for 15 minutes to remove the residual methyl alcohol. The product contained 64.8% of carbon and 35.2% of moisture, its carbon content had a relative efficiency of 302 and its apparent relative efficiency was 196.

The product was again treated with methyl alcohol exactly as above. Its carbon content was now 87.2%, its moisture content had been reduced to 12.8% and the efficiency of its carbon content was now 281. The apparent relative efficiency of the product was 245.

It will be seen that I have developed a process for the ready removal of water from water-containing decolorizing activated carbons which cannot be dehydrated by ordinary methods without objectionable loss of activity. In accordance with my invention, it is possible to accomplish this removal of water without objectionable reduction in the actual activity of the carbon content, and to effect a marked increase in the apparent activity of the carbon, thereby producing a decolorizing carbon which is of desirably low moisture content and at the same time of high activity on an "as is" basis.

As will be apparent from the foregoing description, the invention is applied to the dehydration of activated carbons characterized by the fact that they undergo an objectionable loss in activity when dried by heating to temperatures materially above room temperature, say at 95° C. up to 140° C.

Having fully described my invention, what I claim is:

A process for producing activated carbon comprising heating cellulosic material with more than an equal weight of a chemical activating agent selected from the group consisting of phosphoric acid, sulfuric acid, and zinc chloride, leaching the activating agent from the carbon with water, said heating being conducted at a relatively low temperature and for a period of time such that the carbon has high activity prior to the substantial removal of the leaching water but loses its activity rapidly when dried at temperatures above room temperature, the activity approaching zero when the carbon is so-dried completely, contacting the carbon while still containing a large amount of the leaching water with a water miscible readily volatile organic solvent for a period of time sufficient to displace and dissolve water from the carbon, separating the resulting solution of the solvent and water from the carbon, maintaining the temperature at a value not substantially above room temperature during said contacting and separating steps, and thereafter evaporating the residual volatile solvent from the carbon.

RAYMOND G. DAVIS.